UNITED STATES PATENT OFFICE.

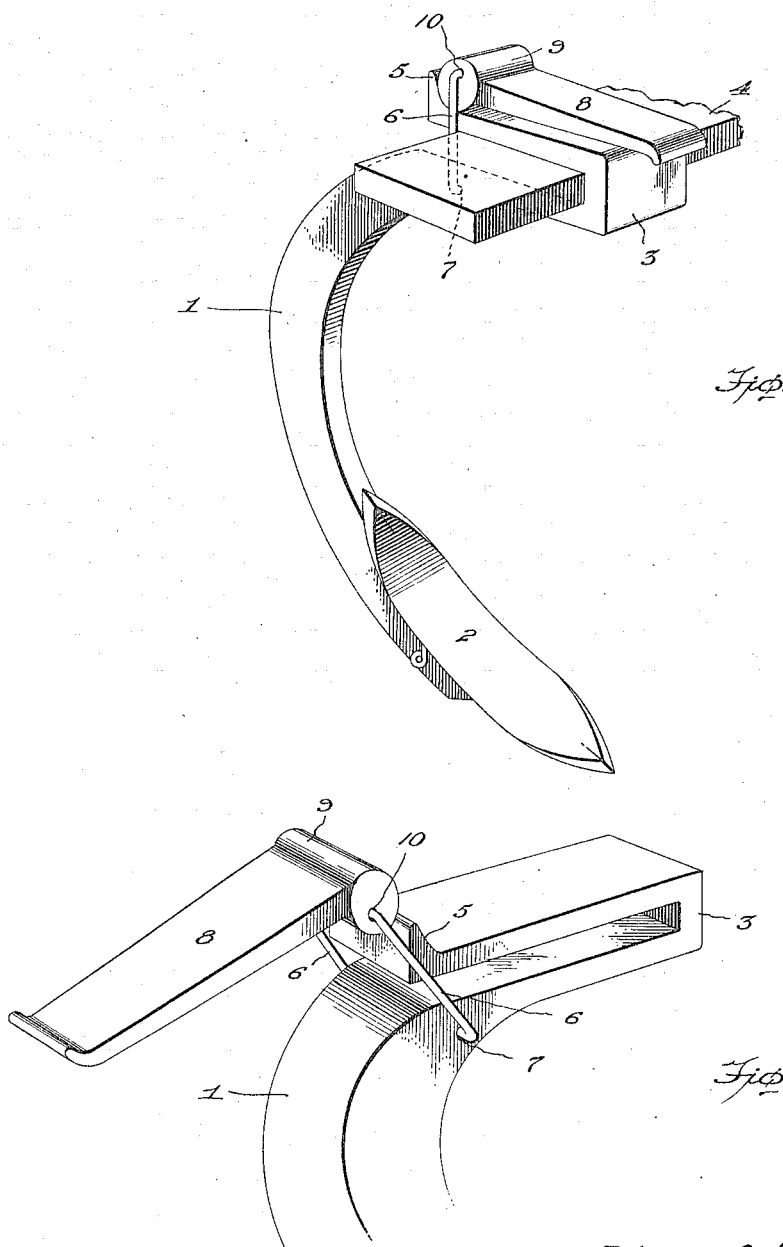

EDGAR W. BENSON, OF RICHMOND, CALIFORNIA, ASSIGNOR OF ONE-HALF TO GEORGE X. FLEMING, OF SACRAMENTO, CALIFORNIA.

CLAMP FOR CULTIVATOR-STANDARDS.

1,180,563. Specification of Letters Patent. Patented Apr. 25, 1916.

Original application filed September 18, 1915, Serial No. 51,394. Divided and this application filed January 6, 1916. Serial No. 70,647.

*To all whom it may concern:*

Be it known that I, EDGAR W. BENSON, a citizen of the United States, residing at Richmond, county of Contra Costa, and State of California, have invented certain new and useful Improvements in Clamps for Cultivator-Standards, of which the following is a specification.

My invention relates to clamps for cultivator standards and has for its object the provision of an improved cam lever and bail, quick detachable and adjustable connection, and an improved standard construction, said parts being adapted for coöperation in a novel manner to secure the standard to the frame of the cultivator, and also to permit quick and easy adjustment thereon or detachment therefrom.

The present application is a division of my application for cultivator standard and shovel, filed September 18, 1915, Serial No. 51,394, but the present invention is not limited in its use to the improved shovel construction shown in that application.

The embodiment of the invention which is set forth hereinafter and shown in the accompanying drawings is to be considered as illustrative, rather than restrictive, of the scope of the invention, as the latter is susceptible of modification without departing from the essential principles thereof.

In the accompanying drawings: Figure 1 is a perspective of the invention as applied to a section of cultivator frame, the shovel shown being only one of various forms which may be used and forming no part of my invention; and Fig. 2, a detail of the upper part of the standard and the clamping means, detached from the cultivator frame.

The standard 1 which carries any suitable shovel or earth treating implement 2 has a looped or rebent upper end 3 adapted to snugly, yet easily, fit the flat portion 4 of the cultivator frame. The looped portion 3 is provided with a rounded or inclined cam surface 5 at its free end and on its upper face. A bail 6 is pivoted at 7 to opposite sides of the standard 1. A cam lever 8 has its cam portion 9 journaled on the upper cross portion 10 of the bail 6 and is adapted to bear against the inclined or rounded cam surface 5. When the lever 8 is raised, the tension is released and the looped portion 3 is then sufficiently free of the frame part 4 to permit the standard 1 to be slid lengthwise of said frame part 4. When the lever 8 is pressed down, as shown in Fig. 1, the cam portion 5 exerts tension on the bail 6 and, due to a certain amount of springiness or resiliency in the upper part of the looped portion 3, the latter is clamped firmly against the frame part 4. The lever 8 will remain in its lowered position, as shown in Fig. 1, due to the pivotal part 10 of the bail 6 being slightly off-set toward the free end of the lever. The bail 6 bears against the rear edge of the frame part 4 and prevents any forward displacement of the looped part 3. The pressure is taken, mainly, on the yoke portion of the part 3.

The construction described obviates the necessity for bolting or otherwise clamping the standard 1 to the frame part 4 and, while affording a secure connection therebetween, permits rapid and easy adjustment.

The bail 6 is of such length and the cams 5 and 9 of such height that when the lever 8 is thrown completely over to the left, Fig. 2, it will clear the upper end of the cam 5 and permit complete detachment of the standard from the part 4, by a movement laterally in relation to said frame part 4.

Having thus described my invention, what I claim as new and desire to secure by Letters Patent, is:—

1. A cultivator standard provided with an open ended clamp portion having a cam surface and adapted to embrace a part of the cultivator frame, a bail pivoted to the standard, and a cam lever carried by the bail and adapted to engage the cam on the clamp, said bail being of such length that the cam lever may clear the cam on the clamp, when desired.

2. A cultivator standard provided with a substantially U-shaped clamp or loop adapted to embrace a part of the frame of a cultivator and having on its free end and upper surface, an incline or cam, a bail pivoted to the standard, and a cam lever carried by the bail and adapted to bear against the incline or cam surface aforesaid when the lever is depressed, said bail and cam lever being proportioned so that when the lever is raised the bail and lever may be swung clear of the free end of the U-shaped clamp.

In testimony whereof, I hereunto affix my signature.

EDGAR W. BENSON.

Copies of this patent may be obtained for five cents each, by addressing the "Commissioner of Patents, Washington, D. C."